Sept. 25, 1923.  
J. L. LEMOINE  
COFFEE AND THE LIKE PERCOLATOR  
Filed Aug. 9, 1920    2 Sheets-Sheet 1
1,468,642
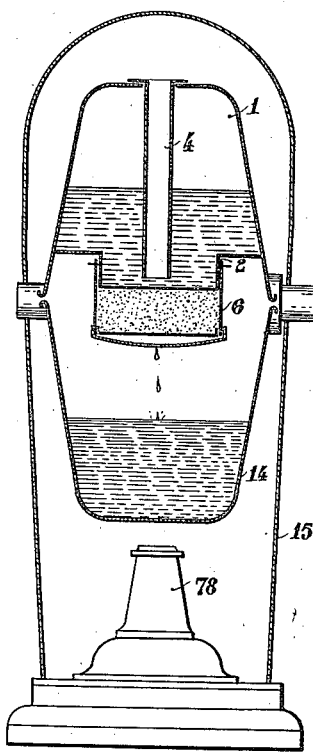
Fig.3.
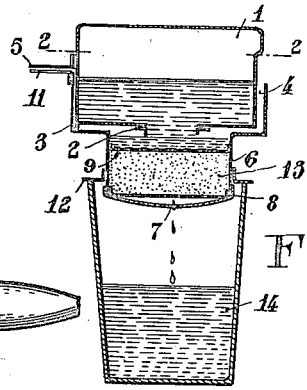
Fig.1.
Fig.2.
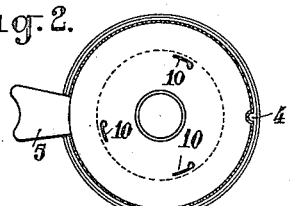
Fig.15.
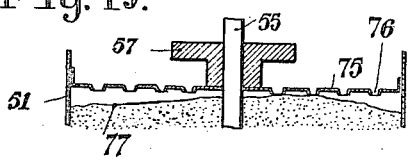
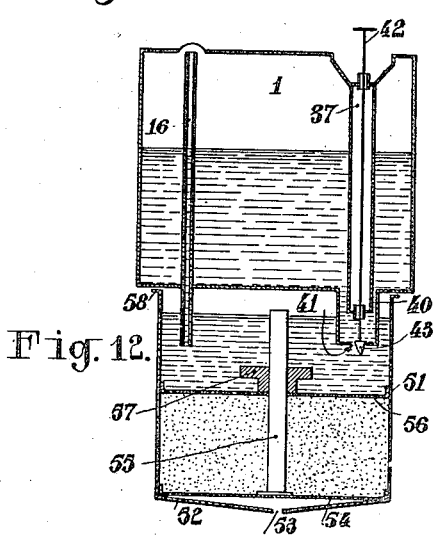
Fig.12.
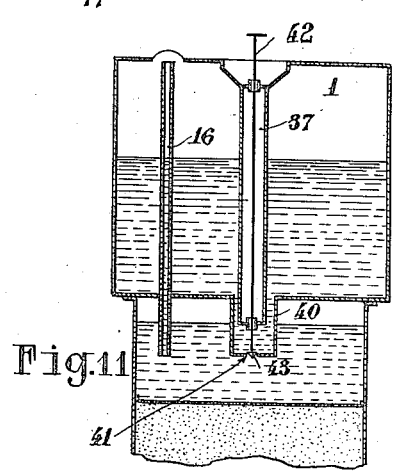
Fig.11.
Inventor:
Jules Louis Lemoine
By Attorney Sept. 25, 1923.

J. L. LEMOINE 1,468,642

COFFEE AND THE LIKE PERCOLATOR

Filed Aug. 9, 1920   2 Sheets-Sheet 2

Inventor:
Jules Louis Lemoine

Patented Sept. 25, 1923.

1,468,642

UNITED STATES PATENT OFFICE.

JULES LOUIS LEMOINE, OF PARIS, FRANCE.

COFFEE AND THE LIKE PERCOLATOR.

Application filed August 9, 1920. Serial No. 402,269.

*To all whom it may concern:*

Be it known that I, JULES LOUIS LEMOINE, a citizen of the Republic of France, residing at Paris, France, have invented certain new and useful Improvements in Coffee and the like Percolators, of which the following is a specification.

My invention relates to an apparatus for the automatic treatment with boiling water of ground coffee, enabling infusions of invariable quality to be obtained corresponding to the maximum exhaustion of the ground material treated.

In the first place, it is necessary that the boiling water pass through the successive horizontal layers of the ground coffee at the same rate of speed so as to insure in those layers the same amount of contact of the water with the ground coffee under the same conditions. This result is practically always obtained when the ground coffee is arranged in a cylindrical portion of the filter.

Moreover, one must maintain a constant settling of the ground coffee during the infusion process, or the ground coffee, under the action of the boiling water swells up very much, which in the well-known filters of today produces an increased pressure in the interior of the ground mass and therefore causes an imperfect contact of the water with the ground coffee.

This essential condition of a constant settling of the ground coffee is moreover advantageously supplemented by other secondary conditions. It is not only of advantage that a constant settling of the ground coffee be maintained, but moreover, that at some point of the ground mass the pressure of the boiling water, during the major portion of the process, be constant. This condition is obtained by maintaining substantially constant the level, under which the flow of the infusion takes place, as well as the pressure of air above the said level.

Finally, it is necessary to carefully control the discharge of the filter so as to always obtain the same duration of time for the infusion process for the treatment of the same amounts of ground coffee, this duration being calculated in such a way as to effect the maximum exhaustion of the ground mass.

My improved filter or percolator is so constructed that the essential requisite of a constant settling of the ground material is fulfilled. My percolator essentially comprises a perforated disc of a selected suitable weight, movable relative to the body of the percolator and resting on the mass of ground coffee. Thus, a constant pressure on the surface of the ground mass and a constant settling of the same is effected.

My invention also relates to various modifications whereby the above said secondary conditions of treatment of ground coffee are met. The characteristic features of those variations will appear from the following detailed description and the claims.

Constructions according to my invention are illustrated, by way of example, on the accompanying drawings, in which:—

Fig. 1 is a vertical section of an apparatus for the preparation of a fixed number of cups of coffee.

Fig. 2 is a horizontal section of such apparatus along the line 2—2 of Fig. 1.

Fig. 3 is a vertical section of a modification of the preceding arrangement.

Figs. 9, 10 and 11 are broken vertical sections of three modifications of the upper reservoir 1 of the apparatus shown in Figs. 4—8.

Fig. 12 is a vertical section of a modification of the percolator.

Figs. 13 and 14 are broken vertical sections of two modifications of the device for evacuating the air of the preceding apparatus.

Fig. 15 is a vertical section of a particular construction of the perforated disc resting on the ground material.

Figure 5:
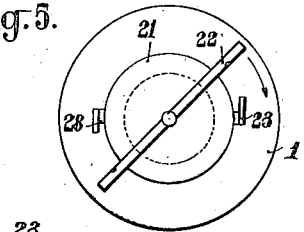
Figs. 4 and 5 are respectively a vertical section and a plan of an apparatus for supplying a variable number of cups of coffee.

The two constructional forms shown in Figs. 1 to 3 are for supplying a fixed number of cups of coffee, one cup for example.

The apparatus (Fig. 1) consists of a cylindrical reservoir 1, to the base of which is soldered a necked disc 2, in a manner such that the border 3 of the reservoir protrudes by several millimetres beyond the plane of the disc 2.

A small channel 4 is obtained by indenting the metal along a generating line of the reservoir 1; the border 3 of the reservoir is cut where it meets this small channel. A flat handle 5 is soldered on the reservoir.

The reservoir 1 serves as a cover to the percolator proper 6. The lower portion of this percolator is closed by a bottom perforated at its centre by an orifice 7, of such size that the percolation is of the desired duration. A very fine sieve 8 is soldered by its periphery to the body of the percolator 6. Another, movable sieve 9 is displaceable under light friction within the percolator; such friction is provided for example by small springs 10 (Fig. 2) secured on the periphery of the sieve 9. A handle 11, similar to that of the reservoir 1, is soldered on the percolator 6. An annular flange 12, secured on the percolator, enables the apparatus to rest on a suitable receiver 14.

The manipulation is effected as follows:—

The ground coffee is placed in the percolator 6 in a homogeneous layer, then the ground coffee is covered by the sieve 9.

The reservoir 1, resting on its base, is filled with boiling water; then it is covered by the filter 6 containing the ground coffee, in such a way that the handles 5 and 11 coincide. These two handles are then grasped together by the operator and the apparatus is inverted on the receptacle 14. The apparatus then is in the position shown in Fig. 1.

The water contained in the reservoir 1, escapes by the neck 2 and fills the percolator 6, until the level of the water reaches the lower border of the neck. At this instant, the atmospheric pressure prevents the reservoir 1 emptying further; however in proportion as the percolator empties by the orifice 7, the level of the water in the percolator sinks accordingly, and the external air, having access through the channel 4, enters the reservoir 1 by its neck, thus permitting the water in the reservoir 1 to flow out anew. An approximately constant pressure of water in contact with the ground coffee is thus obtained.

The charge of water and the section of the orifice are so determined that the percolation proceeds at a rate of speed corresponding to the maximum exhaustion of the ground coffee.

The contrivance above described can be applied to a reversible apparatus called "Russian cafetières", as shown in Fig. 3.

The water reservoir 1 is closed by a necked disc 2, on which is secured, by a bayonet joint, the percolator proper 6, similar to that above described. A tube 4 soldered on the bottom of the water reservoir 1 and opening at such bottom, serves for the inlet of air and its free end determines the constant level of the water above the percolator.

The entire apparatus is articulated on a support 15 of well known form; a lamp 78 effects, by a preliminary operation, the heating of the receptacle 1 and of the water for making the infusion. This apparatus functions in a similar manner as the contrivance shown in Figs. 1 and 2.

Apparatuses intended for supplying a variable number of cups of coffee and having the distinctive characteristics of the invention are shown, by way of example, in Figs. 4 to 12.

The apparatus (Figs. 4 to 6) consists of a water reservoir 1, of which the bottom is connected to the percolator proper by two tubes: one 16, a compensating dipping tube, has its upper end near the top of the reservoir 1, the other 17 provided with a tap 18 terminates at the bottom of the reservoir. The length of the tube 16 below the bottom of the reservoir is greater by 5 to 8 millimetres than the total length of the tube 17.

The reservoir 1 has on top a filling aperture 19 hermetically closed, effected for example by a cover 20 and a bearing spring 22 which is pivoted at its middle on the centre of the cover 20 and the ends of which can engage in the jaws of the two small fixed lugs 23.

The percolator proper 24, on which rests the reservoir 1, consists of a cylindrical body 25 closed by a dished bottom 26, allowing the passage of a tube 27 and another small tube 28. The tube 27 is movable parallel with the axis of the body of the percolator and can slide in a suitable joint 29, packed with cork or rubber for example. It bears graduations determined by experience, which can be brought to coincide with the lower plane of the percolator. These graduations correspond with the number of cups of coffee desired to be obtained. To each graduation corresponds therefore a determined quantity of ground coffee and water to be placed in the apparatus. The tube 27 is closed at its upper end by a diaphragm perforated by an orifice 7 of determined area. The tube 28 terminates at the bottom 26 and is there soldered.

A sieve 8 is soldered by its periphery to the base of the cylindrical body 25 and provides between it and the bottom 26 a space of several millimetres.

A central tube 30 closed at its upper end and coaxial with the body of the percolator is soldered on the sieve 8 and surrounds the tubes 27 and 28. The tube 28 terminates near the closed end of the tube 30.

A perforated disc 9 can slide freely in the cylindrical body 25, and is fast with a central boss 31 of suitably selected weight; this boss embraces with slight friction the central tube 30 and thus ensures the guidance of the disc 9 and a suitable pressure on the ground coffee. This boss can be constituted by a simple tube of determined weight or by a spring having its bearing on the guide stem for example.

The cylindrical body of the percolator has in its upper portion an aperture for the passage of the key of the tap 18 and the free circulation of air between the percolator and the bottom of the reservoir 1.

The entire apparatus rests either on a support 32, or on the receptacle itself which is to receive the infusion of coffee.

The infusion with this preceding apparatus occurs in the following manner:

The tube 27 is placed at the suitable height; the ground coffee is introduced into the percolator 24 and covered by the perforated disc 9; the percolator is then placed on the support 32, and covered by the reservoir 1, the tap 18 being closed. The reservoir 1 is then, by the orifice 19, filled with the necessary quantity of boiling water, after which the orifice is closed by the hermetic cover 20.

The tap 18 is then opened, and the water fills the percolator until its level reaches the lower mouth of the tube 17. The water of the percolator traverses the coffee and the sieve 8; the infusion ascends in the tube 30 and flows out through the tube 27 after having passed the orifice 7.

As the coffee flows out through the tube 27 the level sinks in the percolator, but then air enters, by the tube 17, into the reservoir 1 which empties by the same tube 17, until the water level in the percolator arrives anew at the height of the lower mouth of the tube 17. An approximately constant pressure of water in contact with the ground coffee is thus obtained during the major portion of the operation.

The tube 16 which dips into the water of the percolator, serves as a regulator; when bubbles of air ascend, obstructing the tube 17. Such bubbles being at atmospheric pressure, the water contained in the tube 16 descends and compensates in the percolator for the water which cannot at this moment descend through the tube 17.

The duration of the operation is calculated so that the coffee is exhausted to a maximum. This duration depends upon the distance between the orifice 7 and the level of the water in the percolator 25. This distance is varied according to the quantity of coffee to be treated.

In a modification of the preceding arrangement (Figs. 7 and 8) the outflow is effected under a constant charge, but with an orifice of variable area.

The tubes 27, 28 and 30 are dispensed with. The bottom 26 of the percolator has a circular flat 33 perforated by a certain number of small circular holes $7^1$, $7^2$, $7^3$, $7^4$, $7^5$, of different areas and of which the centres are on one and the same circle concentric with the flat 33. A disc 34 and the flat 33 are relatively pivoted, about their common centre, by a rivet 36. The disc 34 has a circular orifice 35 of a diameter slightly larger than that of the largest of orifices $7^1$, $7^2$, $7^3$, $7^4$, $7^5$ and the centre of which is on the circle of the centres of these orifices, so that it can be successively moved into register with such centres by turning the disc 34 on the flat 33 of the percolator. A pointer $i$ is fast on the disc 34; when such pointer is opposite one of the graduations $i^1$, $i^2$, $i^3$, $i^4$ ... marked on the bottom of the percolator, the orifice 35 is in register with one of the orifices $7^1$, $7^2$, $7^3$, $7^4$ ... which correspond to a supply giving various determined numbers of cups of coffee.

For percolators for large supply, all the preceding orifices can advantageously be replaced by a tap or a slide valve, whereby the supply is regulated in accordance with the size of the volume of ground coffee treated.

Experience has demonstrated that by virtue of the small diameters of the regulating holes for the outflow of the infusion of coffee, and therefore owing to the influence of capillarity, the same orifice could be used for different operations within limits. In other words, for apparatus in which the difference between the minimum supply and the maximum supply is only five to six cups, one single outflow orifice for the infusion of coffee, calculated for the mean supply by the percolator, enables, without additional regulating devices, diverse volumes of infusion to be obtained in very similar periods of time.

Moreover, the area of this orifice is considerably smaller than the total area of the orifices of the lower sieve and than that of the orifices of the upper perforated disc, such that the supply by the percolator is regulated solely by the size of the orifice formed in the closed bottom of the percolator and in no manner by the orifices of the sieve or the perforated disc.

Figure 4:
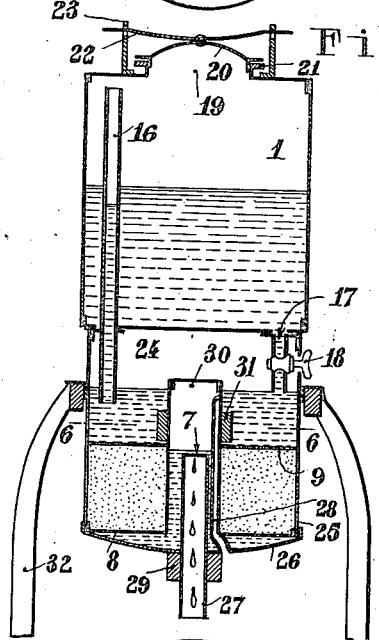
Figure 9:
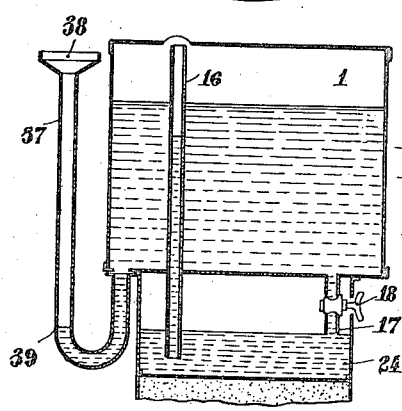
Figure 6:
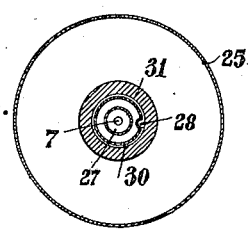
Fig. 6 is a horizontal section of such apparatus along the line 6—6 of Fig. 4.

The water reservoir 1 of Fig. 4 has the disadvantage of emptying itself automatically if the closure of the upper filling aperture is not hermetic. Fig. 9 shows a modification of this construction overcoming this defect.

In this modification, the reservoir 1 is hermetic and its filling is effected by an inverted siphon tube 37; the funnel 38 of this tube has its upper border at a level slightly below the plane of the upper end of the tube 16, so that on filling, the water of the reservoir 1 cannot flow down the tube 16. The bend of the siphon descends to the same level as the lower portion of the tube 16, or to a lower level, i. e. lower than the mouth of the tube 17 which controls the level of the water in the percolator. It is easy to appreciate, that during the operation of the apparatus, the siphon tube will never empty itself and air will never be able to enter by this tube into the reservoir 1, as the level of the water in the descending branch of the siphon tube will maintain itself at 39, i. e. at the level of the water in the percolator.

Figures 10, 13:
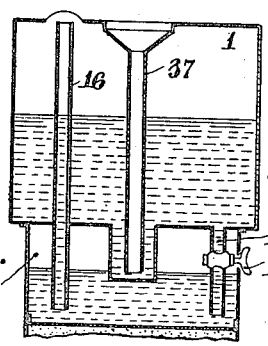

A modification of the preceding contrivance, shown in Fig. 10 is characterized by the lower mouths of the tubes 17 and 16 being in the same horizontal plane, the lower mouth of the tube 37 being in a higher plane. The level of the water will then establish itself in the plane of the mouth of 37, the tubes 17 and 16 dipping into the liquid. Water only flows along the tube 17 and the air enters the reservoir by the tube 37; the tube 16 serves as an air vent tube during the filling of the reservoir.

The tube 17 could moreover be dispensed with as shown in Fig. 11; the closed end of the tube 40 has an orifice 41 closed at will by a small plug 43, provided for example with an operating rod 42, guided in the tube 37. This plug can moreover constitute the end of an independent filling funnel having lateral outflow ports. During filling, the orifice 41 is closed; it is thereafter held open during the whole of the emptying period of the reservoir, the opening and closing movement being moreover effected by any means whatsoever.

The constant water level in the percolator could be obtained by a float valve of any known kind, the float swimming on the water in the percolator and opening or closing the water channel from the reservoir according to the height of the water in the percolator.

Finally, the process can be carried out with an outlet for the coffee of constant area, and by regulating the height of the water level in the percolator by varying the length of the outlet tube from the water reservoir, or by the variation of the distance between the reservoir and the upper surface of the ground coffee in the percolator.

With any of the reservoirs 1 of Figs. 4, 9, 10 or 11 can be combined a special percolator (Fig. 12). This percolator has a very fine sieve 54, mounted in the cylindrical body 51 of the percolator and resting by its external periphery on the bottom 52, whilst providing between it and the bottom a free space of 1 to 2 millimeters. The junction between the border of the sieve 54 and the cylindrical body 51 is hermetic. The sieve 54 is fast with an imperforate stem 55 coaxial with the cylindrical portion of the percolator.

The bottom 52 is provided with an orifice 53 for the outlet of the infusion of coffee; a perforated disc 56 fast on a boss 57 is engaged around the imperforate stem 55. This stem 55 serves both for manipulating or placing the sieve 54 in position and for guiding the perforated disc 56.

The action of the apparatus of Fig. 12 is similar to that of the other contrivances above described; the infusion of coffee, after having traversed the ground coffee and the sieve 54, flows out directly by the orifice 53 into the receiving vessel; this receptacle is of such dimensions that the infusion of coffee contained therein never comes into contact with the lower portion of the percolator.

A single orifice 53 is provided in the bottom 52.

Figure 7:
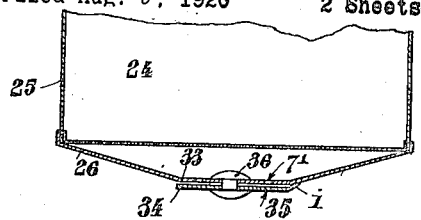
Figs. 7 and 8 are respectively a broken vertical section and a plan of a modification of the preceding apparatus.
Figure 8:
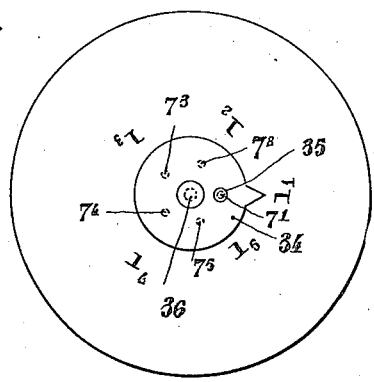

In the above described percolators, wherein the infusion of coffee flows out through one or more orifices provided at the bottom of the percolator, for example in the contrivances of Figs. 7, 8 and 12, it is necessary to ensure the evacuation of the air which finds itself trapped between the lower sieve and the bottom of the percolator.

The evacuation can be effected by means of a tube 63 (Fig. 13) coaxial with the cylindrical portion of the percolator and of which the lower part opens beneath the lower sieve and the upper part above the level of the water in the percolator.

In order to avoid water or grains of ground material passing into this tube its upper end, for example, may be covered by a cap 59, and small holes 60, 61, 62 . . . formed laterally.

The tube 63 serves both for the evacuation of the air and the guidance of the disc 56.

Figure 14:
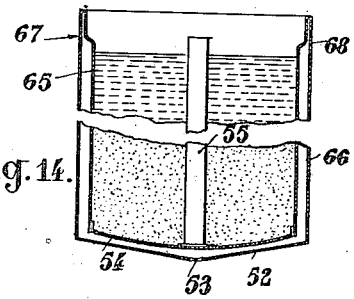

The evacuation of the air can be obtained by constructing the percolator proper in two parts (Fig. 14), an inner part 65, fast with the sieve 54, and an outer part 66 provided with the perforated bottom 52. The percolator 65 is encased by the jacket 66, in such a manner that between these two is left an annular space for the air, which will escape by the small orifices 67, 68, etc., formed in the upper portion of the envelope 66, the level of these orifices being higher than the level of the water.

The surface of the ground coffee, placed on the lower sieve of any of the preceding percolators, is uneven; as a result, the upper perforated disc and its boss rest only on portions of such surface. The boiling water therefore traverses unequal thicknesses of ground coffee, resulting in a uniform exhaustion of the ground coffee.

The perforated disc device of Fig. 15, should be applied to all the previously described percolators, in order to avoid the above indicated defect; the perforated disc 75 is formed with protuberances, such as 76, on the face which comes into contact with the ground coffee. In order to render uniform the upper surface 77, on which the disc rests, the perforated disc 75 need merely be turned around its axis, whereby the ground coffee is raked level.

For supplying small quantities the above described contrivances may be modified as follows:

For example taking an apparatus constructed for a supply which can be varied from two to ten cups, by considering that 40 cc. of ground coffee per 120 cc. of water are required, the capacity of the percolator must be at least 40 cc. × 10=400 cc., plus a certain capacity for the layer of water above the ground coffee, say 100 cc. The total capacity of the percolator will therefore be at least 400+100=500 cc.

If in such a percolator it is desired to prepare three cups of coffee, the volume of the ground coffee will be 40 × 3=120 cc. and the space unoccupied in the percolator will become 500 cc. — 120 cc.=380 cc.

However for three cups, 120 × 3=360 cc. of water are required, and accordingly, at the beginning of the operation, all the water poured into the reservoir will immediately fill the percolator, not even reaching the height of the constant level.

From this it follows that the percolators proper above described, can, for small quantities be used alone, their upper parts constituting then merely water reservoirs.

The apparatus forming the subject of the present invention can be constructed in various metals, or in earthenware, in porcelain, or in combinations of materials, earthenware and metal, and the like. They may obviously be made as apparatus of large dimensions, commonly designated urns.

Finally, although the invention has been described on the assumption that it is applied to the preparation of infusions of coffee, the invention is nevertheless capable of being employed under the conditions described, for the preparation of other similar infusions, such as tea, lime, (tilia), and the like.

Claims:

1. In a percolator for making infusions from coffee and the like, a cylindrical filter body having a bottom provided with a capillary orifice for controlling the rate of flow of the infusion, a lower sieve secured in the said filter body above its bottom and adapted to support the material to be treated, such as ground coffee, a perforated disc freely movable in the said filter body and adapted to bear on the material to be treated, exerting constant pressure thereon, an air outlet tube carried by the said filter body, means for insuring the communication of the said tube with the free space enclosed between the said lower sieve and the bottom of the said filter body, and means insuring the communication of the said tube with the outside of the said filter body.

2. In a percolator for making infusions from coffee and the like, a cylindrical body having a bottom provided with a capillary opening for controlling the rate of flow of the infusion, a lower sieve secured in the said filter body above its bottom, and adapted to support the material to be treated, such as ground coffee, a perforated disc freely movable in the said filter body and adapted to bear on the material to be treated, exerting thereon a constant pressure, an air outlet tube secured on the said lower sieve, the lower open end of the said tube communicating with the free space enclosed between the said lower sieve and the said bottom of the said filter body, the upper closed end of the said tube having lateral openings for the escape of air.

3. In a percolator for making infusions from coffee and the like, a cylindrical filter body having a bottom provided with a capillary orifice for controlling the rate of flow of the infusion, a lower sieve secured in said filter body above its bottom, and adapted to bear the material to be treated, such as ground coffee, a perforated disc freely movable in the said filter body and adapted to bear on the material to be treated, and exerting thereon a constant pressure, an air outlet tube arranged within the said filter body and acting as a guide for the said perforated disc, means insuring the communication of the said tube with the free space enclosed between the said lower sieve and the bottom of the said filter body, and means insuring the communication of this tube with the outside of the said filter body.

4. In a percolator for making infusions from coffee and the like, a cylindrical filter body having a bottom provided with a capillary orifice therein for controlling the rate of flow of infusion, a lower sieve secured within said filter body above its bottom, and adapted to bear the material to be treated, such as ground coffee, a perforated disc freely movable in the said filter body, and adapted to bear the material to be treated, exerting thereon a constant pressure, a boss secured to the said perforated disc, an air outlet tube arranged within the said filter body serving as a guide for the said boss, means insuring the communication of the said tube with the free space enclosed between the said lower sieve and the bottom of the said filter body, and means insuring the communication of the said tube with the outside of the said filter body.

5. In a percolator for making infusions from coffee and the like, a cylindrical filter body comprising two parts nested one within the other and enclosing between them an annular space, the outer part of the said filter body having a bottom provided with a capillary orifice for controlling the rate of flow of the infusion, a lower sieve secured to the inner part of the said filter body above its bottom, and adapted to support the material to be treated, such as ground coffee, a perforated disc movable in the said filter body, and adapted to rest the materials to be treated, exerting thereon a constant pressure, air outlet openings provided at the upper end of the outer part of the said filter body, and providing a communication for the said annular space enclosed between the said outer and inner parts of the filter body with the outside thereof.

In testimony whereof I have affixed my signature in the presence of two witnesses.

JULES LOUIS LEMOINE.

Witnesses:
　Louis Gardet,
　Clement S. Edwards.